Patented Apr. 6, 1954

2,674,608

UNITED STATES PATENT OFFICE 2,674,608

TREATMENT OF RICINOLEIC ACID AND THE DERIVATIVES THEREOF BY CAUSTIC ALKALIES

Georges Dupont and Oscar Kostelitz, Paris, France, assignors to Societe Organico, Paris, France, a society of France No Drawing. Application June 28, 1950, Serial No. 170,960

Claims priority, application France July 1, 1949

9 Claims. (Cl. 260—406)

It is well known that when castor oil, ricinoleic acid, or the derivatives thereof, are treated with caustic alkalis, sebacic acid or 10-hydroxy-decanoic acid, or a mixture of these acids, is obtained. The resulting alkaline soaps are hard. They are poor conductors of heat and practically impossible to mix by mechanical agitation. This results in the reaction mass being liable to be locally over-heated adjacent to the walls of the reactor, while its central portions are at the same time insufficiently heated thus reducing the efficiency of the process.

It has been suggested, in an attempt at overcoming these drawbacks, to dilute the reaction mass with mineral oil having a boiling point above 180° C. In such procedure, the reaction is conducted in an heterogeneous medium, because none of the constituents of the reaction mixture are soluble in the mineral oil. It accordingly becomes necessary to form a fine dispersion of the solid soaps in the mineral oil, an operation which requires the provision of extensive mechanical means.

We have found it possible to conduct the above-mentioned reaction in an homogeneous liquid medium, provided that, according to the present invention, it be conducted in the presence of alkaline derivatives of phenolic compounds such as phenol, the cresols, xylenols and/or the like. These compounds constitute in and of themselves solvent, starting reagent and reaction product.

These compounds, which are hereinafter designated by the generic expression "alkaline phenates," are stable at the temperatures at which the reaction is effected. They form excellent solvents for the various constituents of the reaction mixture, especially for the sodium hydroxide, the water and the alkaline soaps of organic acids. By the reaction being effected in a homogeneous liquid medium, all danger of local overheating is averted. It is therefore sufficient to use simple means of mechanical agitation, which means have no other function than making the temperatures uniform. Whereas in the prior methods it was needed to disperse the solids throughout a nonsolvent liquid.

The alkaline phenates used as solvents may be prepared in advance or, simpler still, formed in situ within the reactor.

In the latter case, a mixture comprising the sodium hydroxide necessary for the formation of the phenate, the necessary sodium hydroxide for the reaction, water, a phenol or a mixture of phenols, and ricinoleic acid or a derivative thereof such as castor oil is charged into the reactor.

The mixture is gradually heated to the reaction temperature and held at that temperature for the requisite time necessary to complete the reaction.

The proportion of phenolic solvent to be used, in terms of the weight of phenol, relative to the total weight of caustic soda, is from 10% to 70%—the preferred range being from 30% to 50%.

Depending on the temperature at which the reaction is conducted, variable proportions of sebacic acid and 10-hydroxy-decanoic acid are obtained.

The proportion of sebacic acid formed increases directly with increased temperatures. Thus at 180° C. a major proportion of 10-hydroxy-decanoic acid is formed, while at 250° C. and above, practically only sebacic acid is obtained.

As the reaction proceeds, volatile products, chiefly comprising water and organic compounds including 2-octanone and 2-octanol are discharged. At the lower temperatures, the ketone predominates. At higher temperatures an increasing proportion of the alcohol is formed. The discharged vapors consisting of water and organic compounds are condensed and recycled into the reactor.

To separate the sebacic acid from the 10-hydroxy-decanoic acid, which coexist after the reaction has been completed, the mixture is preferably acidified. This releases the organic acids; phenols and water is then added to separate the sebacic acid in aqueous solution. The hydroxy-decanoic acid which appears in the form of a supernatant oily layer is isolated from the remaining constituents of the layer, i. e. by diluting said constituents in a substance nonsolvent for the hydroxy-acid and solvent for the said remaining constituents of the oily layer, and then filtering.

Specifically, the following typical procedure may be used:

After the reaction is completed, the reaction mass is dissolved in water. The reaction products may be isolated in the following way: the alkaline solution is acidified with 58% sulfuric acid to about pH 2. This releases all of the organic acids and phenols. Water is added to the mixture in an amount such that all of the sebacic acid present will, when brought to the boil, pass into an aqueous solution. The phenols, the 10-hydroxy-decanoic acid and the other organic acids separate off in the form of a supernatant oily layer. The aqueous layer is subjected to a settling step while hot and if required bleached with activated carbon then filtered. On cooling, the sebacic acid crystallizes out. The crystals are drained, washed and dried.

To separate the hydroxy-decanoic acid contained in the oily layer, the said layer may be diluted with a liquid such as carbon tetrachloride which is a solvent for the fatty acids but not solvent for the hydroxy-acid.

When drained and filtered cold, the hydroxy-decanoic acid remains on the filter while the remaining acids pass through in the filtrate.

The acid thus obtained may be purified by re-dissolving in a dilute solution of caustic soda, bleaching the latter with activated carbon, filtering off the carbon and precipitating the hydroxy-acid with an inorganic acid.

The ensuing examples will illustrate the method of the invention, without however restricting its scope to the specific details of procedure given.

*Example 1.—Preparation of sebacic acid*

A mixture of:

385 grams caustic soda
139 grams tri-cresol
110 grams water
500 grams castor oil is subjected to mechanical agitation and gradually heated to 250° C. At about 135° C., water and some octanone-2 begin to distill off. These and compounds are condensed and recycled into the reaction apparatus. As the temperature rises, the rate of distillation of the water and the organic compounds distill increases. At about 210° C. a discharge of hydrogen is observed. Heating is continued until a temperature of 250° C. is reached and this temperature is then maintained over a period of 2 hours, all the while continuing to reflux the condensed volatile compounds into the reactor. After the reaction has been completed, the recycling of the condensates is stopped and these condensates are recovered separately. The distillate comprises a lower aqueous layer and an upper layer of organic products which chiefly contain octanol-2. The organic layer is rectified, and 136 grams of a mixture containing 95% octanol-2 and 5% octanone-2 is recovered.

The reaction mass is dissolved in about 10 liters water. The alkaline solution is acidified with diluted sulfuric acid until a pH of about 2 is obtained, releasing the organic acids and the phenols. The mixture is brought to a boil, whereupon the sebacic acid becomes dissolved in water and the phenols and other organic acids form a supernatant oily layer. The hot aqueous solution is subjected to a settling step, bleached with activated carbon and filtered hot. On cooling, the sebacic acid crystallizes from the solution. The crystals are drained, washed with water and dried.

208 grams of 99% pure sebacic acid are obtained in this way.

*Example 2.—Preparation of 10-hydroxy-decanoic acid*

A similar mixture of castor oil, caustic soda, tri-cresol and water as that described in Example 1 is mechanically agitated and gradually heated to 180° C.–195° C., the temperature being maintained for 3 hours. The volatile substances which discharge are condensed and recycled into the reaction apparatus. On completion of the reaction, the refluxing of the condensates is arrested and the condensed substances are collected separately. The distillate separates off into two layers, a lower layer consisting of water and an upper layer consisting of a mixture of octanone-2 and octanol-2. The organic layer is rectified yielding 125 grams of a mixture comprising 70% octanone-2 and 30% octanol-2.

The reaction mass is dissolved in 5 liters of water. The solution is heated to boiling, whereupon it separates into two layers. The aqueous layer is subjected to settling while hot. It then is treated to separate the sebacic acid in the manner described in Example 1 yielding 18 grams of sebacic acid.

The oily layer is mixed while hot with 1.5 liter of carbon tetrachloride and allowed to cool. The hydroxy-decanoic acid precipitates out. This is drained, and washed on the filter with carbon tetrachloride. The resulting acid is purified by dissolving in dilute soda, bleaching the solution with activated carbon and precipitating with diluted sulfuric acid. 154 grams of 10-hydroxy-decanoic acid are thus obtained.

What we claim is:

1. In a process of producing at least one product selected from the group consisting of sebacic acid and 10-hydroxy decanoic acid as reaction products of ricinoleic acids and derivatives thereof with a caustic alkali, the steps of forming an aqueous solution containing in solution at least one substance selected from the group consisting of ricinoleic acid, its derivatives and compounds containing the same, at least one caustic alkali and at least one alkali metal phenoxide; heating said solution at a temperature sufficiently high to cause reaction between said substance and said caustic alkali, thereby forming a reaction mass including reaction products; and recovering the thus formed reaction products.

2. In a process of producing at least one product selected from the group consisting of sebacic acid and 10-hydroxy decanoic acid as reaction products of ricinoleic acids and derivatives thereof with a caustic alkali, the steps of forming an aqueous solution containing in solution at least one substance selected from the group consisting of ricinoleic acid, its derivatives and compounds containing the same, at least one caustic alkali and at least one alkali metal phenoxide, the amount of the phenol of said alkali metal phenoxide in said solution being between 10–70% by weight of the total amount of alkali in said solution; heating said solution at a temperature sufficiently high to cause reaction between said substance and said caustic alkali, thereby forming a reaction mass including reaction products; and recovering the thus formed reaction products.

3. In a process of producing at least one product selected from the group consisting of sebacic acid and 10-hydroxy decanoic acid as reaction products of ricinoleic acids and derivatives thereof, comprising the steps of forming an aqueous solution containing in solution at least one substance selected from the group consisting of ricinoleic acid, its derivatives and compounds containing the same, at least one caustic alkali and at least one alkali metal phenoxide of a penol selected from the group consisting of phenol, cresols, xylenols and naphthols, the amount of the phenol of said alkali metal phenoxide in said solution being between 10–70% by weight of the total amount of alkali in said solution; heating said solution at a temperature sufficiently high to cause reaction between said substance and said caustic alkali, thereby forming a reaction mass including reaction products; and recovering the thus formed reaction products.

4. In a process of producing at least one product selected from the group consisting of sebacic acid and 10-hydroxy decanoic acid as reaction products of ricinoleic acids and derivatives thereof with a caustic alkali, the steps of forming an aqueous solution containing in solution at least one substance selected from the group consisting of ricinoleic acid, its derivatives and compounds containing the same, at least one caustic alkali and at least one alkali metal phenoxide heating said solution at a temperature of about 180–250° C. so as to cause said substance and said caustic alkali to react, thereby forming a reaction mass including reaction products; and recovering the thus formed reaction products.

5. A process of producing reaction products of ricinoleic acids and derivatives thereof, comprising the steps of forming an aqueous solution containing in solution at least one substance selected from the group consisting of ricinoleic acid, its derivatives and compounds containing the same, at least one caustic alkali and at least one alkali metal phenoxide, the amount of the phenol of said alkali metal phenoxide in said solution being between 10–70% by weight of the total amount of alkali in said solution; heating said solution to a temperature of about 180–250° C. so as to cause the components thereof to react, thereby forming reaction products; and separating the thus formed reaction products.

6. A process of producing reaction products of ricinoleic acid and derivatives thereof, comprising the steps of dissolving in water at least one substance selected from the group consisting of ricinoleic acid, its derivatives and compounds containing the same, at least one caustic alkali and at least one phenol so as to cause reaction of said phenol with said caustic alkali and form an alkali metal phenoxide, thereby forming an aqueous solution containing in solution said ricinoleic acid substance, at least one caustic alkali and an alkali metal phenoxide, the amount of the phenol of said alkali metal phenoxide in said solution being between 10–70% by weight of the total amount of alkali in said solution; heating said solution to a temperature of about 180–250° C. so as to cause the components thereof to react, thereby forming reaction products; and separating the thus formed reaction products.

7. A process of producing reaction products of ricinoleic acid and derivatives thereof, comprising the steps of dissolving in water at least one substance selected from the group consisting of ricinoleic acid, its derivatives and compounds containing the same, at least one caustic alkali and at least one phenol selected from the group consisting of phenol, cresols, xylenols and naphthols so as to cause reaction of said phenol with said caustic alkali and form an alkali metal phenoxide, thereby forming an aqueous solution containing in solution said ricinoleic acid substance, at least one caustic alkali and an alkali metal phenoxide, the amount of the phenol of said alkali metal phenoxide in said solution being between 10—70% by weight of the total amount of alkali in said solution; and heating said solution to a temperature of about 180–250° C. so as to cause the components thereof to react, thereby forming reaction products; and separating the thus formed reaction products.

8. A process of producing mainly sebacic acid from ricinoleic acid and derivatives thereof, comprising the steps of forming an aqueous solution containing in solution at least one substance selected from the group consisting of ricinoleic acid its derivatives and compounds containing the same, at least one caustic alkali and at least one alkali metal phenoxide; heating said solution at a temperature of about 250° C. so as to cause the components thereof to react, thereby forming mainly sebacic acid as reaction product; and separating the thus formed sebacic acid from the formed reaction mixture.

9. A process of producing mainly 10-hydroxy decanoic acid from ricinoleic acid and derivatives thereof, comprising the steps of forming an aqueous solution containing in solution at least one substance selected from the group consisting of ricinoleic acid its derivatives and compounds containing the same, at least one caustic alkali and at least one alkali metal phenoxide; heating said solution at a temperature of about 180–195° C. so as to cause the components thereof to react, thereby forming mainly 10-hydroxy decanoic acid as reaction product; and separating the thus formed 10-hydroxy decanoic acid from the formed reaction mixture.

No references cited.